Oct. 23, 1951     J. E. MOE     2,572,276
RESILIENT ROLLER
Filed April 15, 1949
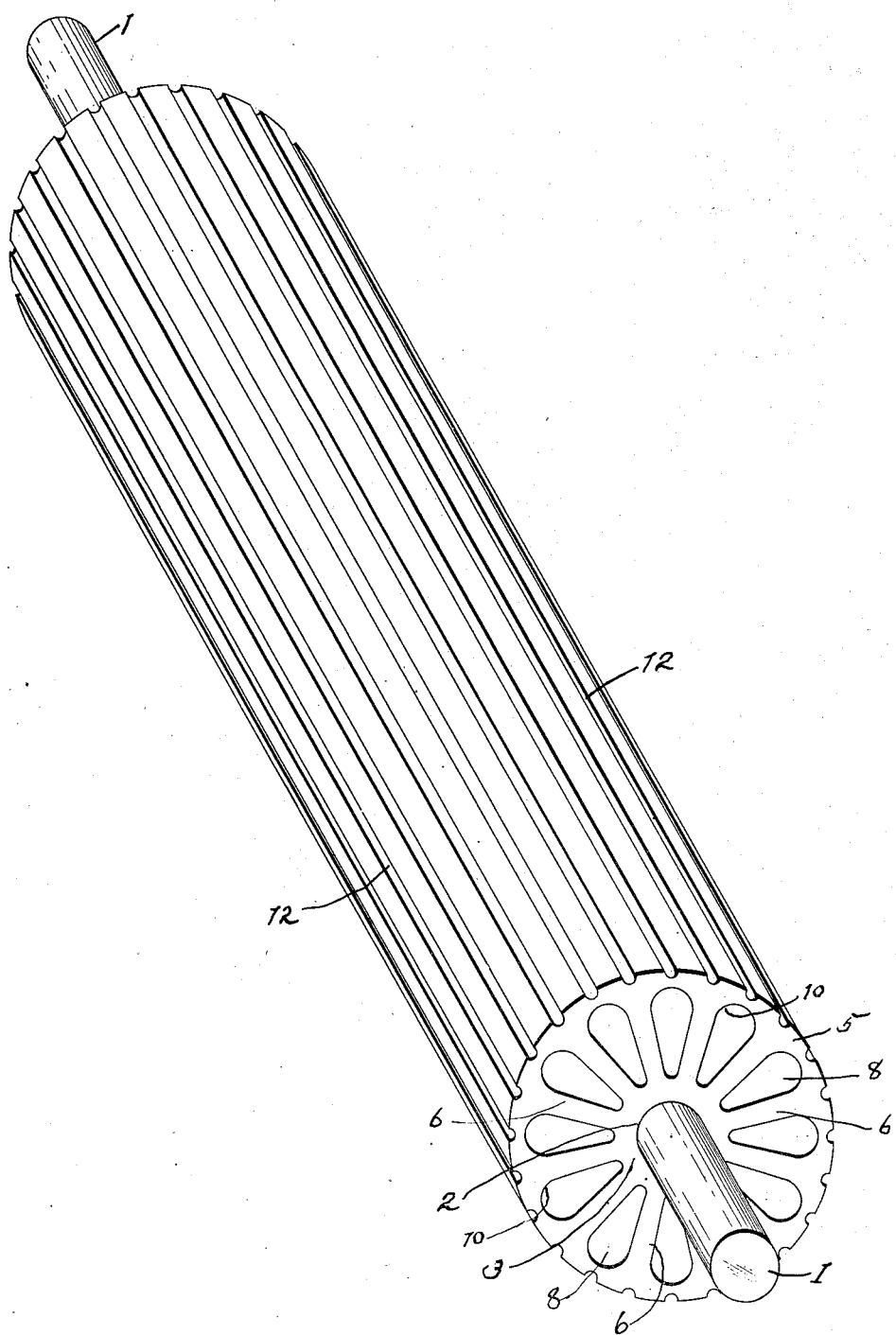
Inventor
by: J Edgar Moe
James R. Hodder Attorney Patented Oct. 23, 1951

2,572,276

UNITED STATES PATENT OFFICE 2,572,276

RESILIENT ROLLER

J. Edgar Moe, Danielson, Conn., assignor to The Bullard Clark Company, Danielson, Conn., a corporation of Connecticut Application April 15, 1949, Serial No. 87,690

1 Claim. (Cl. 152—7)

My present invention is a novel and improved construction of a resilient roller, cylinder, or the like, formed of rubber, rubberlike compounds, synthetic plastics, and either of vulcanizable or non-vulcanizable extrudable material, which can be economically manufactured in continuous lengths by an extruding process and then cut to the length desired.

Heretofore rollers for various purposes such as for supporting load-carrying belts, transporting coal, gravel, or the like, or for various mechanical uses were usually made with a solid core of metal or wood and then fitted or covered with a rubber sleeve. In many cases such rollers were made of solid rubber to give strength, wear-resistance and resiliency.

Also rollers which were used in machinery of various kinds and for lawnmowers previously were made with metal or wood for the core and a predetermined thickness of yieldable covering material where resiliency was required. Where such rollers had to withstand considerable heat as well as load, and also where extremes of heat and cold were involved, as in outdoor weather conditions, the manufacture of such rollers presented serious problems and difficult and expensive processes.

By my present invention, I am enabled to produce a cylindrical article or roller with resilient capacity, together with great strength and wear-resistance for use in load-carrying, extremes of heat and cold, for indoor or outdoor use, and which will be wear-resistant and long-lasting to a high degree, and economical to manufacture by a simple extruding process.

Furthermore, I may utilize any extrudable material whether of rubber, rubber compounds of various kinds with materials incorporated therein to give any desired degree of relative hardness or resiliency on the surface of the roller, and with an air-cooling, air-cushioning, and resilient capacity upon the thin outer surface of the roller, thereby effecting great economy in the mass of material used.

In carrying out my present invention, I employ a suitable plastic rubber compound or a synthetic plastic composition which can be extruded thru a die, which die has a plurality of cores which will produce a central hub with an opening for the shaft, and a plurality of radially extending webs from the shaft to the circumference or periphery of the roller forming pear-shaped spaces between the webs. The cylindrical structure is extruded in long lengths, hardened or cured by vulcanizing; or of non-vulcanizable plastic, when it may be otherwise treated and permanently set, and thereafter the cylindrical structure is cut into the various lengths desired.

For this purpose, I have designed a resilient hollow cylindrical structure which will afford a maximum of lightness and strength both to the hub and to the circumference, with a minimum of material, and with radially extending webs from hub to periphery, being preferably in a form to give substantially continuous support to the periphery or circumference from the hub and yet with sufficient openings to insure an air-cooling and cushioning action.

Such openings are, of course, formed by the cores in the die and may be round, square, or of other contour in cross-section but, preferably, are formed of pear-shaped contour with the narrow end adjacent the hub, and the wider and larger dimension adjacent the rim or circumference, the intervening web being in a radial line from the hub and center outwardly to the circumference.

This construction is especially desirable as giving continuous strength and support to the outer surface, with a relatively slight thickness of material. These cored openings may be also utilized to increase the resiliency of the roll, if desired.

One of the special advantageous uses to which my present invention can be applied is in the manufacture of rollers for lawnmowers. Heretofore, such rollers were of wood or solid rubber, with short lengths of metal fitted in an opening in each end for an axle. These rollers were, of course, subjected to outdoor use and, hence, to the wearing and damaging influences of heat, cold, weather, alternate moisture and dryness, and the like. If of wood or with a wooden core, they frequently cracked and split under working conditions and the small axles that fitted in each end would drop out. If such rollers were of solid rubber, they lack resilience, were expensive and of excessive weight, and particularly so where a molding operation was employed.

As illustrative of my present resilient extruded roller of rubber or rubberlike material, I have shown the same in the accompanying drawing for lawnmower use, and among the advantages are a continuous axle, light, strong, wear-resisting roller with the surface impervious to moisture or damage, and of ample strength and sufficient resiliency, which also results in quiet, smooth operation, and reduces shock to the lawnmower machine or to the user, and capable of long life, continuous use, and eliminating all danger of the end axles becoming loose and lost.

As shown in the drawing, the figure illustrates a lawnmower roller, shown in perspective, economically extruded thru a die and cut in any desired length for the width of lawnmower desired, and mounted on a continuous axle 1, extending with a friction, adhesive, or "freezing" fit thru the central cored opening 2 in a hub portion 3, the hub and periphery or rim 5 being united by a series of radially extending webs, 6, 6, 6 from the hub 3 to the rim 5, thus giving direct support therebetween.

I prefer to form the series of openings indicated at 8 in the form of a curved fillet, or the like, as indicated at 10, which in turn gives a firmer, stronger, and broader union and support to the rim 5, while thus permitting a relatively thin thickness to the rim 5 and lightness in the roller, thereby saving material.

If desired, the outer rim 5 may be smooth or may be grooved, as indicated at 12—12, and the desired length and diameter, as well as the relative hardness, toughness, and resiliency readily produced in the extrudable material employed.

It will thus be appreciated that an important advantage of my present invention consists in the formation of an extremely wear-resisting, resilient, air-cushioned and air-cooled rubber or rubberlike structure with the advantages incident to a steel or metal axle throughout the entire length, which latter will not become dislodged in use, particularly when employed as the roller on a lawnmower. The special pear-shaped form of the openings between the radial ribs from the hub to the periphery of the roller are also important as they conserve material from which the roller is made, give a substantially complete supporting effect on the outer periphery of the roller because of the curved fillet or pear-shaped contour of the openings, and thus permit economy of material in the outer rim because of this supporting arrangement from one radial rib to the other.

I claim:

A resilient cylindrical hollow roller for use on lawnmowers or the like, having an outer fluted wall, and a reinforced support for the outer wall, comprising an extruded mass of resilient material formed with a central hub and a longitudinal opening therethru of slightly less diameter than that of an axle to be fitted therein to hold said axle with inherently gripping contraction, a plurality of radially extending resilient ribs integral with said hub and said outer wall of the roller, said ribs extending from the hub to the inner part of said outer wall, each rib having enlarged ends at its juncture with said outer wall, said ribs being formed with interspaced openings therebetween in pear-shaped form, whereby a resilient construction between said central hub and the outer wall of the roller is provided with substantially continuous support for the outer wall by the enlarged rib ends.

J. EDGAR MOE.

REFERENCES CITED

The following references are of record in the file of this patent:

UNITED STATES PATENTS

| Number | Name | Date |
|---|---|---|
| 1,754,188 | Coldwell | Apr. 8, 1930 |
| 2,161,666 | Cowen | June 6, 1939 |
| 2,298,142 | Martin | Oct. 6, 1942 |